(12) United States Patent
Gruhler

(10) Patent No.: US 9,851,244 B2
(45) Date of Patent: Dec. 26, 2017

(54) VIBRATION SENSOR WITH BONDED DRIVE

(71) Applicant: VEGA GRIESHABER KG, Wolfach (DE)

(72) Inventor: Holger Gruhler, Tuningen (DE)

(73) Assignee: Vega Grieshaber KG, Wolfach (DE)

( * ) Notice: Subject to any disclaimer, the term of this patent is extended or adjusted under 35 U.S.C. 154(b) by 275 days.

(21) Appl. No.: 14/603,461

(22) Filed: Jan. 23, 2015

(65) Prior Publication Data

US 2015/0308888 A1 Oct. 29, 2015

(30) Foreign Application Priority Data

Feb. 4, 2014 (DE) .................. 10 2014 101 372

(51) Int. Cl.
*G01F 23/296* (2006.01)
*G01H 11/08* (2006.01)

(52) U.S. Cl.
CPC ......... *G01H 11/08* (2013.01); *G01F 23/2966* (2013.01)

(58) Field of Classification Search
CPC ............................. G01H 11/08; G01F 23/2966
USPC .......................................................... 73/649
See application file for complete search history.

(56) References Cited

U.S. PATENT DOCUMENTS

| 5,170,088 A * | 12/1992 | Naito | H01H 3/22 |
| | | | 200/181 |
| 5,583,280 A * | 12/1996 | Mo | G01N 29/032 |
| | | | 128/DIG. 12 |
| 5,815,679 A * | 9/1998 | Liu | G06F 3/002 |
| | | | 348/734 |
| 2002/0005682 A1* | 1/2002 | Kato | H02N 2/0045 |
| | | | 310/333 |
| 2006/0119026 A1* | 6/2006 | Ryaboy | F16F 15/02 |
| | | | 267/140.15 |
| 2009/0309457 A1* | 12/2009 | Doshida | G02B 7/08 |
| | | | 310/323.02 |
| 2012/0167877 A1* | 7/2012 | Pumm | A61M 11/005 |
| | | | 128/200.14 |
| 2013/0313084 A1 | 11/2013 | Mellert et al. | |

FOREIGN PATENT DOCUMENTS

| DE | 32 19 626 C2 | 5/1984 |
| DE | 195 23 461 C1 | 7/1996 |
| EP | 0773372 A2 | 5/1997 |
| HU | 228414 B | 3/2013 |
| JP | S63-233 331 A | 9/1988 |

(Continued)

OTHER PUBLICATIONS

Search report dated Jun. 15, 2015 issued in corresponding Hungarian Patent Application No. P1500008.

(Continued)

*Primary Examiner* — J M Saint Surin
(74) *Attorney, Agent, or Firm* — Juneau & Mitchell

(57) ABSTRACT

Vibration sensor comprising a membrane, which can be excited to vibrate by means of a drive, wherein the drive has at least one piezo actuator, which is designed so as to be bonded with the membrane, wherein the membrane has at least one centering device that is designed to be suitable for orienting and keeping the drive centered relative to the membrane.

18 Claims, 3 Drawing Sheets

(56) References Cited

FOREIGN PATENT DOCUMENTS

| | | | |
|---|---|---|---|
| JP | H01-227 017 A | | 9/1989 |
| JP | 02112733 A | * | 4/1990 |
| JP | 09205126 A | | 8/1997 |

OTHER PUBLICATIONS

Office Action dated Nov. 10, 2014 issued in Corresponding German patent application No. 10 2014 101 372.7.

* cited by examiner

VIBRATION SENSOR WITH BONDED DRIVE

CROSS REFERENCE TO RELATED APPLICATIONS

This patent application claims priority to German Patent Application 10 2014 101 372.7, filed on Feb. 4, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a vibration sensor with a bonded drive.

Background of the Invention

The prior art discloses vibration sensors that are used, for example, as vibration limit switches. In this case the vibration sensor has a membrane, which can be excited to vibrate by a drive and by means of which the mechanical oscillator, which is mounted on the membrane, can be excited to vibrate. Independently of the state, in which the mechanical oscillator is covered with a filling material and independently of the viscosity of this filling material, this mechanical oscillator vibrates at a characteristic frequency that can be detected by the vibration sensor and can be transformed into a measurement signal.

It is well-known to use a bonded drive in such vibration limit switches, wherein in order to produce an adhesive layer on the membrane, an adaptor ceramic element is bonded with the membrane, and on said adaptor ceramic element in turn an adhesive layer is applied, and with this adhesive layer a piezo actuator is bonded, and then finally contact is made with said piezo actuator by means of a flexible printed circuit board, a so-called flex circuit board. In the above described production process it is difficult to bond the individual components one on top of the other with uniformly thin adhesive layers, because the thickness of these adhesive layers varies as a function of the viscosity of the adhesive, the amount of adhesive that is used and the contact force that is applied. However, adhesive layers of different thickness have an impact on the targeted measurement results, and thus lead to undesired deviations of the measurement results.

Moreover, it has proved to be disadvantageous that in the above described assembly process, the individual components are held concentric to one another, and that said individual components have to be placed in such a way that they are centered relative to the membrane. To date the known prior art has achieved these requirements by using a housing made of a synthetic plastic material, in order to center the individual components and for the bonding process.

The object of the present invention is to make available an improved vibration sensor that avoids the drawbacks known from the prior art.

This engineering object is achieved by means of a vibration sensor and a method for producing a vibration sensor exhibiting the features disclosed herein.

BRIEF SUMMARY OF THE INVENTION

The vibration sensor comprising a membrane, which can be excited to vibrate by means of a drive, wherein the drive has at least one piezo actuator, and is designed so as to be bonded with the membrane, wherein the membrane has at least one centering device that is designed so as to be suitable for orienting the drive centered relative to the membrane.

The vibration sensor as described herein, wherein the centering device is designed as a centering dome, which is arranged in a centered manner on the membrane, in the form of a sleeve.

The vibration sensor as described herein, wherein the centering device is designed as a supply device for an adhesive for bonding the drive and the membrane.

The vibration sensor as described herein, wherein the centering device is designed as a hollow cylinder.

The vibration sensor as described herein, wherein the hollow cylinder has at least one opening in the radial direction, preferably slotted in the longitudinal direction.

The vibration sensor as described herein, wherein the adaptor ceramic element is arranged between the membrane and the piezo actuator of the drive.

The vibration sensor as described herein, wherein the membrane and/or the adaptor ceramic element and/or the piezo actuator has and/or have a surface structure that is configured so as to be suitable to promote the spread of the adhesive between the membrane and the adaptor ceramic element and/or between the adaptor ceramic element and the piezo actuator.

The vibration sensor as described herein, wherein the surface structure is designed as a depression that is introduced into the membrane and/or the adaptor ceramic element and/or the piezo actuator.

The vibration sensor as described herein, wherein the depression is designed as at least one groove that is introduced into the surface of the membrane and/or the adaptor ceramic element and/or the piezo actuator and that is designed to extend preferably in essence in the radial direction.

The vibration sensor as described herein, wherein the surface structure is designed as an elevation.

The vibration sensor as described herein, wherein the elevation is designed as at least one web that is affixed on a surface of the membrane and/or the adaptor ceramic element and/or the piezo actuator.

The vibration sensor as described herein, wherein the web is designed to extend preferably in the circumferential direction and is arranged preferably on an outer periphery of the membrane, the adaptor ceramic element or the piezo actuator.

The vibration sensor as described herein, wherein the elevation is produced by means of a printing process, preferably a screen printing process.

The vibration sensor as described herein, wherein the surface structure has a height of 5 to 30 μm.

The vibration sensor as described herein, wherein a surface of the membrane that faces the drive is designed so as to be concave.

The vibration sensor as described herein, wherein the centering device and the drive have outer and/or inner contours that are designed so as to correspond to one another and that enable an arrangement of the drive relative to the membrane in a predefined orientation.

A production method, which is intended for a vibration sensor comprising a membrane that can be excited to vibrate by means of a drive, wherein the drive and the membrane are bonded to one another, and the drive has at least one piezo actuator, said production method comprising the steps: arranging in a centered manner the drive on the membrane, and introducing an adhesive into a space, adjacent to the drive and the membrane, whereby the adhesive is distributed between these elements due to a capillary action; and curing the adhesive.

The production method as described herein, wherein the drive consists of at least one adaptor ceramic element and at least one piezo actuator, said method comprising the steps: arranging in a centered manner the adaptor ceramic element on the membrane, arranging in a centered manner the piezo actuator on the adaptor ceramic element, introducing an adhesive into a space, adjacent to the membrane, the adaptor ceramic element and the piezo actuator, whereby the adhesive is distributed between these elements due to a capillary action; and curing the adhesive.

The production method as described herein, wherein the adhesive is introduced into a centering dome, which is designed essentially in the form of a hollow cylinder and is longitudinally slotted and which keeps the drive centered.

DETAILED DESCRIPTION OF THE INVENTION

Figure 1:
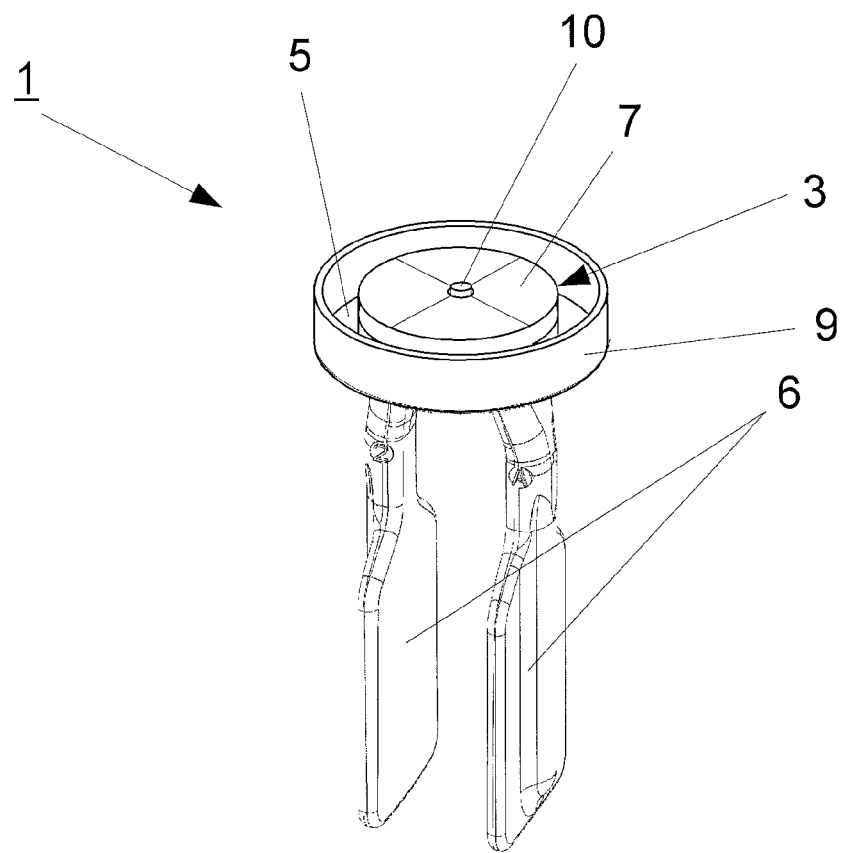
FIG. 1 is a line drawing evidencing a perspective view of a first embodiment of a vibration sensor that is presented only for illustrative purposes.

An inventive vibration sensor comprising a membrane, which can be excited to vibrate by means of a drive, has a drive comprising at least one piezo actuator, where in this case the drive is bonded with the membrane, and the membrane has at least one centering device that is designed so as to be suitable for orienting the drive centered relative to the membrane.

Based on the aforesaid, a vibration sensor according to the invention makes it possible to dispense, in particular, with an additional housing for orienting the drive relative to the membrane due to a centering device, which is disposed on the membrane, and, as a result, makes it possible to achieve a substantial reduction in the number of components that are required.

The centering device can be designed, for example, as a centering dome that is arranged on the membrane in such a way that it is centered.

In the present embodiment a centering dome is defined as a centering device, which is designed in the manner of a sleeve or in the form of a hollow cylinder and which is formed on the membrane in such a way that it is centered or which is integrally molded in one piece with said membrane. Such a centering device, which is designed as a centering dome, makes it possible to achieve, in particular, the objective that a drive having a central opening, i.e. a drive, in which, for example, an adaptor ceramic element and a piezo actuator are designed in each case in the form of a ring and, as a result, exhibit a central opening, is slid onto the centering dome with this opening and, in so doing, can be automatically oriented so as to be centered in relation to the membrane.

In a further development of the invention that makes it possible to further simplify the assembly, the centering device can be designed as a supply device for an adhesive for purposes of bonding together the drive and the membrane. In particular, if the centering device is designed as a hollow cylinder, which has at least one opening preferably in the radial direction, it is possible to push the drive onto the centering device and then to supply an adhesive by way of the centering device. Said adhesive comes in contact with the drive and the membrane in the radial direction through the opening and is distributed between these the individual components by means of capillary forces. This arrangement makes it possible to produce uniformly thick thin and high quality layers of adhesive that are, in particular, not dependent on the amount of adhesive that is applied. A particularly simple configuration of the openings in the radial direction can be achieved, if the hollow cylinder is designed in such a way that it is slotted in the longitudinal direction. This configuration makes it possible to achieve, in particular, that the adhesive comes in contact with the drive over the entire height of the centering device, and as a result, a reliable adhesive bond can be achieved.

The above embodiment is advantageous, especially if the drive is constructed in two parts from an adaptor ceramic element and the piezo actuator, where in this case the adaptor ceramic element is arranged between the membrane and the piezo actuator.

In this embodiment the adaptor ceramic element and the piezo actuator are pushed onto the centering device and then are bonded together by introducing an adhesive preferably by way of the centering device that is designed as a supply device. Then the adhesive will be distributed both between the membrane and the adaptor ceramic element as well as between the adaptor ceramic element and the piezo actuator owing to the effective capillary forces. In this case the net result is high quality adhesive layers having a reproducible thickness between both the membrane and the adaptor ceramic element and also between the adaptor ceramic element and the piezo actuator.

Since the membrane, the adaptor ceramic element and the piezo actuator often have smooth surfaces of very high quality, it may be necessary to provide said surfaces with a surface structure that is designed so as to be suitable to promote the spread of the adhesive between the membrane and the adaptor ceramic element and/or between the adaptor ceramic element and the piezo actuator. Such a surface structure can be designed, for example, as an elevation and/or a depression, which is selectively affixed on and/or introduced into the membrane, the adaptor ceramic element or the piezo actuator.

With a suitable surface structure it is possible to set reliably a defined distance between the individual components. Then the effective capillary forces cause the adhesive to enter into the space, to spread between the components and to produce the desired adhesive bond.

The surface structure can be designed, for example, as a depression, in particular, as a groove that extends preferably more or less in the radial direction and that is introduced into the membrane and/or the adaptor ceramic element and/or the piezo actuator.

As an alternative or in addition, the surface structure can also be designed as an elevation. In this case the elevation can be designed, for example, as at least one web, which can be affixed on a surface of the membrane and/or the adaptor ceramic element and/or the piezo actuator. Such a web can be designed to extend preferably in the circumferential direction and can be arranged preferably on an outer periphery of the membrane, the adaptor ceramic element or the piezo actuator. Such an elevation can be produced, for example, by means of a printing process, preferably a screen printing process. Such a printing process can be used to produce clearly structured layers having a specified layer thickness, so that a high quality fabrication with constant sensor properties is possible.

The surface structure, irrespective of whether it involves a depression or an elevation, has preferably a height of 5 to 30 μm.

In an additional embodiment a top surface of the membrane that faces the drive is designed so as to be concave, so that in interaction with a planar surface of the drive a cavity is created, in which the adhesive can also be distributed extremely well owing to the capillary forces.

According to a further development of the invention the centering devices and the drive can have outer and/or inner contours that are designed in such a way that they correspond, in particular, to one another. The outer and/or inner contours make it possible to arrange the drive in relation to the membrane in a predefined orientation. For this purpose the centering device can have, in particular, protrusions, which interact with the recesses, which are designed to correspond to said protrusions, in the drive in such a way that a certain orientation of the drive in the circumferential direction of the membrane is achieved. This arrangement is expedient, especially if a drive is used with a piezo actuator that is constructed in four segments, where in this case two segments, which are arranged opposite each other in the radial direction, are designed as the transmitters, i.e. in order to excite a vibration, and the two other segments, which are arranged opposite each other in the radial direction, are designed as the receivers, i.e. in order to detect a vibration. In order to achieve a functional arrangement here, it is necessary for the individual segments to be in a predefined orientation relative to a mechanical oscillator, which is disposed on the membrane, an arrangement that can be achieved, for example, by means of the above described key and lock principle with mutually corresponding protrusions and recesses.

Furthermore, a contacting flex circuit board can be integrated into the key and lock principle. Its correct orientation in the circumferential direction is very important precisely in the case of a piezo that is divided into four segments, a feature that also necessitates that the flex circuit board have four poles to make contact.

However, it necessitates an additional adhesive bonding process with a conductive adhesive, since the flex circuit board has to be bonded with the piezo in a conductive manner and only at four points.

According to an inventive production method, which is intended for a vibration sensor comprising a membrane that can be excited to vibrate by means of a drive, and in which the drive and the membrane are bonded to one another, and the drive has at least one piezo actuator, the following steps are carried out in the sequence cited below:

arranging in a centered manner the drive on the membrane, introducing an adhesive into a space, adjacent to the drive and the membrane, so that the adhesive is distributed between these elements due to a capillary action; and curing the adhesive.

The method according to the invention makes it possible to achieve, in particular, the objective that consistently thin and high quality layers of adhesive are obtained owing to the capillary action, whereas such adhesive layers cannot be obtained with a prior art method, in which first an adhesive is applied onto the membrane and then the drive is disposed on said membrane.

In a further development of the method, in which the drive consists of at least one adaptor ceramic element and at least one piezo actuator, the following steps are carried out:

arranging in a centered manner the adaptor ceramic element on the membrane, arranging in a centered manner the piezo actuator on the adaptor ceramic element, introducing an adhesive into a space, adjacent to the membrane and the adaptor ceramic element and the piezo actuator, so that the adhesive is distributed between these elements due to a capillary action; and curing the adhesive.

In this case the method according to the invention is adapted, in particular, to drives that are made in multiple parts. In this case the individual parts of the drive are arranged one after the other in such a way that they are centered and then they can be bonded together.

The above methods are advantageous, especially if the adhesive is introduced into a centering dome, which is designed as a supply device that is designed more or less in the form of a hollow cylinder and is longitudinally slotted. Said centering dome keeps the drive or more specifically its components centered in relation to the membrane.

DETAILED DESCRIPTION OF THE FIGURES

FIG. 1 shows a perspective view of a vibration sensor 1 in a simplified form. For the sake of a better overview, a housing and an electric actuator of the vibration sensor 1 are not shown, and only one drive 3, which acts on the membrane 5, and the paddle 6 of the vibration sensor 1 that can be made to vibrate by means of the drive 3 are shown. In the present embodiment, which is shown only for illustrative purposes, the membrane 5 is designed so as to be circularly round and has a circumferential rim 9, which can be used, in particular, to connect the vibration sensor 1 to additional components and which circumferentially supports the membrane 5.

In the present embodiment, which is shown only for illustrative purposes, the drive 3 of the vibration sensor 1 is constructed from a piezo actuator 7 and an adaptor ceramic element 8, which is arranged between the piezo actuator 7 and the membrane 5. Said drive is oriented by means of a centering device 10 in such a way that said drive is centered relative to the membrane. In the present embodiment, which is shown only for illustrative purposes, the centering device 10 is designed as a centering dome that is designed more or less in the form of a pin and is molded on the membrane 5. Such a centering device 10 can be used to obtain a centered orientation of the drive 3 relative to the membrane 5, so that there is no need for a housing, which is also known to be necessary from the prior art, for the drive 3.

The piezo actuator 7 of the present embodiment, which is shown only for illustrative purposes, consists of four segments, where in this case two radially opposite segments of the piezo actuator 7, are designed as the transmitters, i.e. in order to excite the mechanical vibrations of the membrane 5 and with it the paddle 6, and the two other radially opposite segments are designed as the receivers, i.e. in order to detect the mechanical vibrations.

Figure 2:
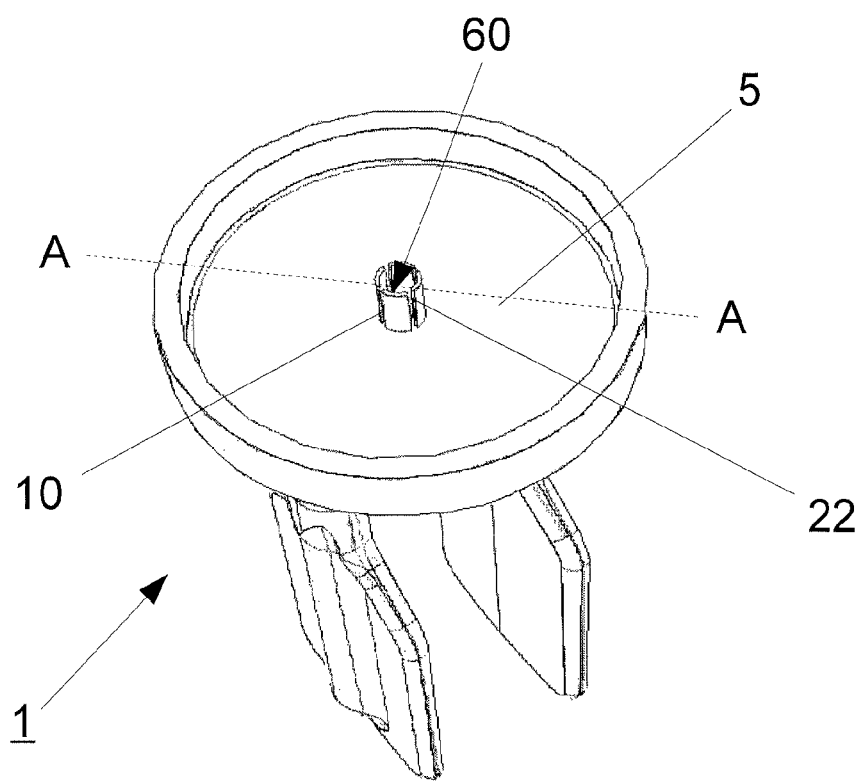
FIG. 2 is a line drawing evidencing an alternative embodiment of the vibration sensor from FIG. 1 without a drive.

FIG. 2 shows an alternative embodiment of the vibration sensor 1 from FIG. 1. In FIG. 2 the drive 3 is not shown for the sake of a better overview.

The vibration sensor 1 in FIG. 2 is constructed in a manner more or less analogous to the vibration sensor 1 from FIG. 1. In the present embodiment that is shown only for illustrative purposes, the centering device 10 is designed as a centering dome that is designed more or less in the form of an element having the shape of a sleeve or a hollow cylinder, so that said centering dome is molded on the membrane 5 in a centered position. In the present embodiment that is shown only for illustrative purposes, the centering device 10 is designed so as to be slotted four times over its entire length in the longitudinal direction, so that between a space 60, formed in the interior of the centering device 10 by means of its hollow formation, there is a connection to a region outside the centering device 10. This arrangement makes it possible to feed adhesive into the space 60 inside the centering device 10, which is designed as a supply device for this purpose, when the drive 3, consisting of an adaptor ceramic element 8 and a piezo actuator 7, is put on the centering device 10. Subsequently the capillary forces, acting between the membrane 5 and the adaptor ceramic element 8 as well as between the adaptor ceramic element 8 and the piezo actuator 7, cause the adhesive to be distributed between these components, thus forming an adhesive layer having a reproducible thickness.

Figure 3:
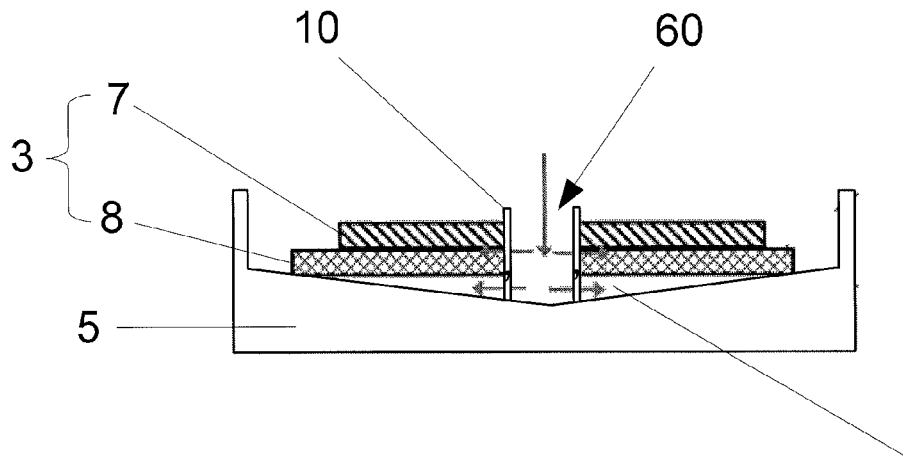
FIG. 3 is a line drawing evidencing a sectional view of the membrane of the vibration sensor from FIG. 2 with the drive installed.

FIG. 3 shows a sectional view of the vibration sensor 1 from FIG. 2 along the line A-A, wherein in the drawing in FIG. 3 the drive 3 is put on the centering device 10.

FIG. 3 shows very clearly that in the present embodiment, which is shown only for illustrative purposes, the membrane 5 of the vibration sensor 1 is constructed with a concave surface that faces in the direction of the drive 3. Since the adaptor ceramic element 8 has a flat top surface that is oriented in the direction of the membrane 5, when the adaptor ceramic element 8 is pushed onto the centering device 10, a cavity 13 is formed between these two components. The piezo actuator 7 sits flush on the adaptor ceramic element 8 and has a somewhat smaller diameter than the adaptor ceramic element 8. Therefore, in the present embodiment, which is shown only for illustrative purposes, both the adaptor ceramic element 8 and the piezo actuator 7 are designed in the shape of a ring and have in each case a central opening 81, 71, by means of which they can be put on the centering device 10. The centering device 10 is designed, as already described above, in the shape of a sleeve or a hollow cylinder, so that the hollow configuration in the interior of the centering device 10 creates a space 60, into which adhesive can be introduced in order to bond the membrane 5, the adaptor ceramic element 8 and the piezo actuator 7.

Owing to the capillary forces acting between the membrane 5 and the adaptor ceramic element 8 as well as the capillary forces acting between the adaptor ceramic element 8 and the piezo actuator 7, the adhesive that is introduced into the space 60 is distributed between these components due to the viscosity of the adhesive, and an adhesive layer is formed over the whole surface. Since the effective capillary forces depend absolutely on the viscosity of the adhesive that is used as well as on the distances between the components, it is possible to obtain adhesive layers of a constant thickness while simultaneously retaining the quality of the components that are used and the adhesive that is used, in particular, independently of the amount of adhesive that is applied into the space 60.

Figure 4:
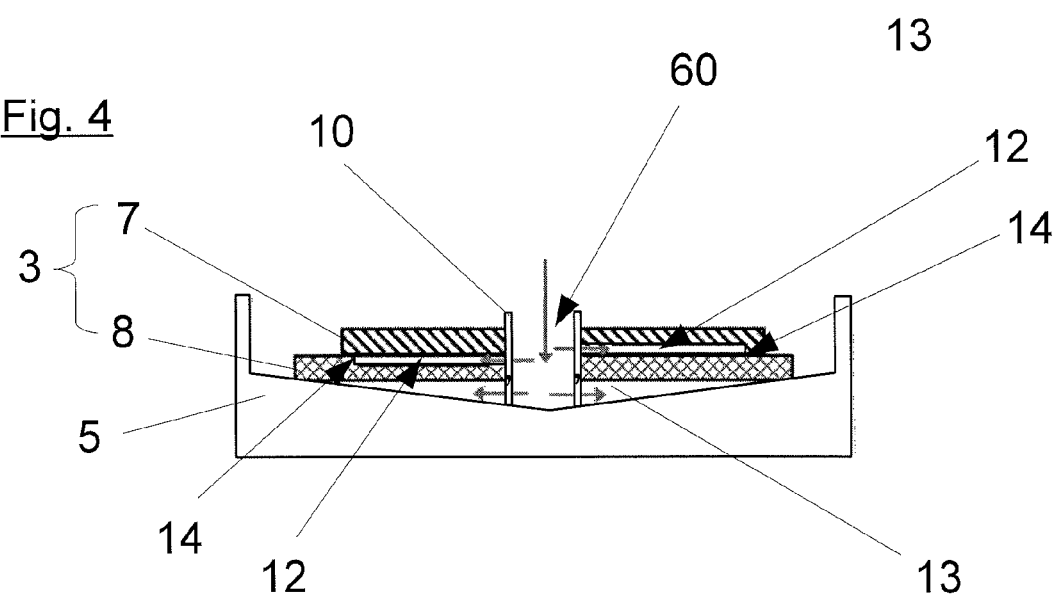
FIG. 4 is a line drawing evidencing an alternative embodiment of the arrangement from FIG. 3 in two design variants.

FIG. 4 shows two alternative embodiments of the drive 3 from FIG. 3.

In the left half of FIG. 4 the adaptor ceramic element 8 has a surface structure that can be designed as a depression 12 or an elevation 14. Starting from the adaptor ceramic element 8 from FIG. 3, in FIG. 4 in the left half a depression 12 is introduced into the adaptor ceramic element 8 on its side that faces the piezo actuator 7 and that extends outwards from the opening 81 in the center of the adaptor ceramic element 8. The depression 12 causes the distance that exists naturally between the adaptor ceramic element 8 and the piezo actuator 7 to enlarge, so that the objective of improving the propagation of the adhesive, which is introduced into the space 60, between the adaptor ceramic element 8 and the piezo actuator 7 is achieved.

An alternative embodiment is shown in the right half of FIG. 4, where the depression 12 is introduced into the surface of the piezo actuator 7 that faces the adaptor ceramic element 8. With this depression 12 it is also possible to achieve the objective of improving the spread of the adhesive between the adaptor ceramic element 8 and the piezo actuator 7. As an alternative to depressions 12, it is also possible to provide suitably designed elevations 14 that are also depicted in FIG. 4.

At the same time the above described depressions 12 can be designed, for example, as grooves, extending in the radial direction, or also as a circularly round depression that has a diameter that is somewhat smaller than the diameter of the smaller, upper component. As an alternative or in addition, the depicted elevations 14 can be designed as webs, which extend in the circumferential direction and which can be affixed, for example, by means of a screen printing process.

Figure 5:
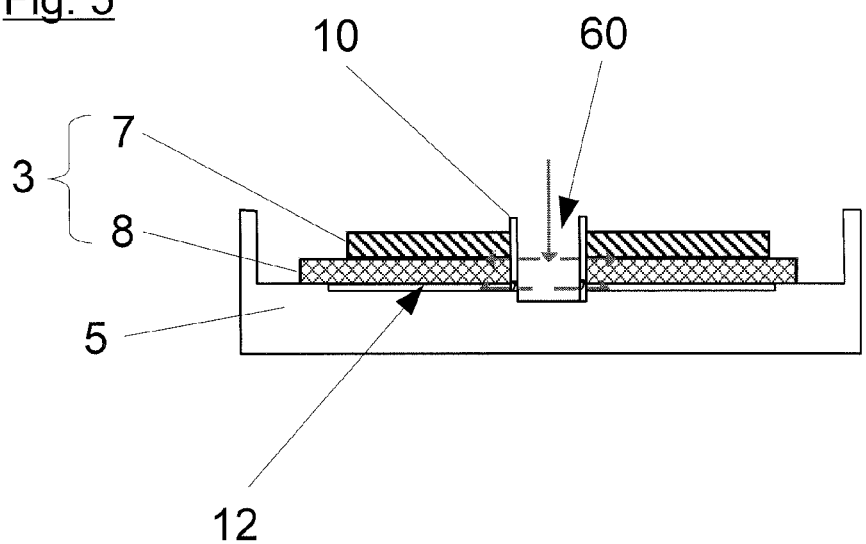
FIG. 5 is a line drawing evidencing an additional possible embodiment of the arrangement from FIGS. 3 and 4.

FIG. 5 shows an additional alternative embodiment of the vibration sensor 1 from FIG. 2, where in this embodiment, which is shown only for illustrative purposes, a membrane 5 having a flat surface that is oriented relative to the drive is selected. In order to achieve in this case an improved propagation of the adhesive, which is introduced into the space 60, between the adaptor ceramic element 8 and the membrane 5, the membrane 5 has a depression 12, which in the present embodiment, which is shown only for illustrative purposes, is achieved by means of a circumferential step, which can be produced, for example, during a turning operation in the production of the membrane 5 that is made of stainless steel. The design variants described in FIGS. 3 to 5 can be freely combined with each other without deviating from the subject matter of the present invention, so that, for example, an embodiment with a membrane 5 having a flat top surface that is oriented relative to the drive is also conceivable, wherein in this case, for example, the adaptor ceramic element 8 can have a surface structure 8 on its top surface that is oriented relative to the membrane 5.

Figure 6:
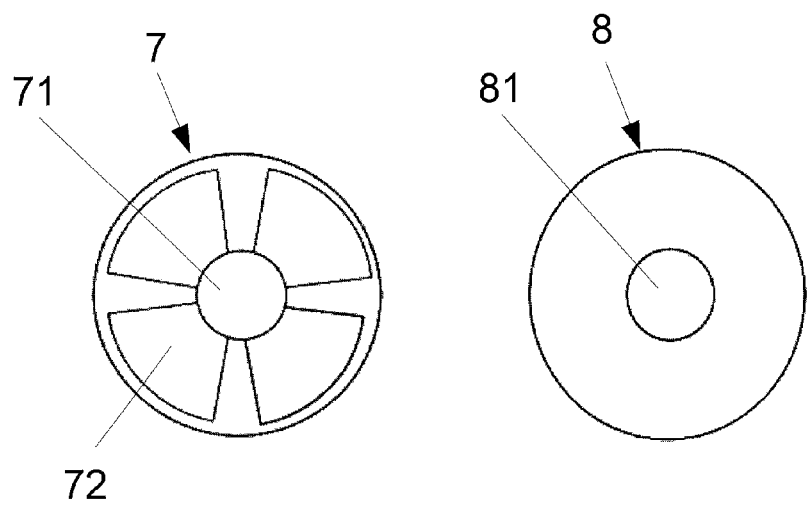
FIG. 6 is a line drawing evidencing a plan view of the components of the drive from FIGS. 3 and 5.

FIG. 6 shows a piezo actuator 7, which is designed in the shape of a ring, and an adaptor ceramic element 8, which is designed in the shape of a ring, just as in the case of the vibration sensors 1 that can be used as in FIGS. 1 to 5. The depressions 12 or the elevations 14 that may or may not be provided are not shown in FIG. 6 for the sake of a better overview.

The piezo actuator 7, shown in FIG. 6, is designed with a central opening 71, where in this case the electrodes 72, which are disposed on the piezo actuator 7, form an embodiment of the piezo actuator 7 that is subdivided into four pieces or more specifically is segmented into four pieces. In each case two radially opposite electrodes 72 are used as the transmitters when the drive 3 is running, and the other two radially opposite electrodes 72 are used as the receivers. The adaptor ceramic element 8 is also formed with a central recess 81, where in this case the two recesses 71, 81 have a diameter corresponding to a diameter of the centering device 10, so that the adaptor ceramic element 8 and the piezo actuator 7 can be pushed essentially free of play onto the centering device 10, and, in so doing, a centered orientation relative to the membrane 5 can be achieved.

Figure 7:
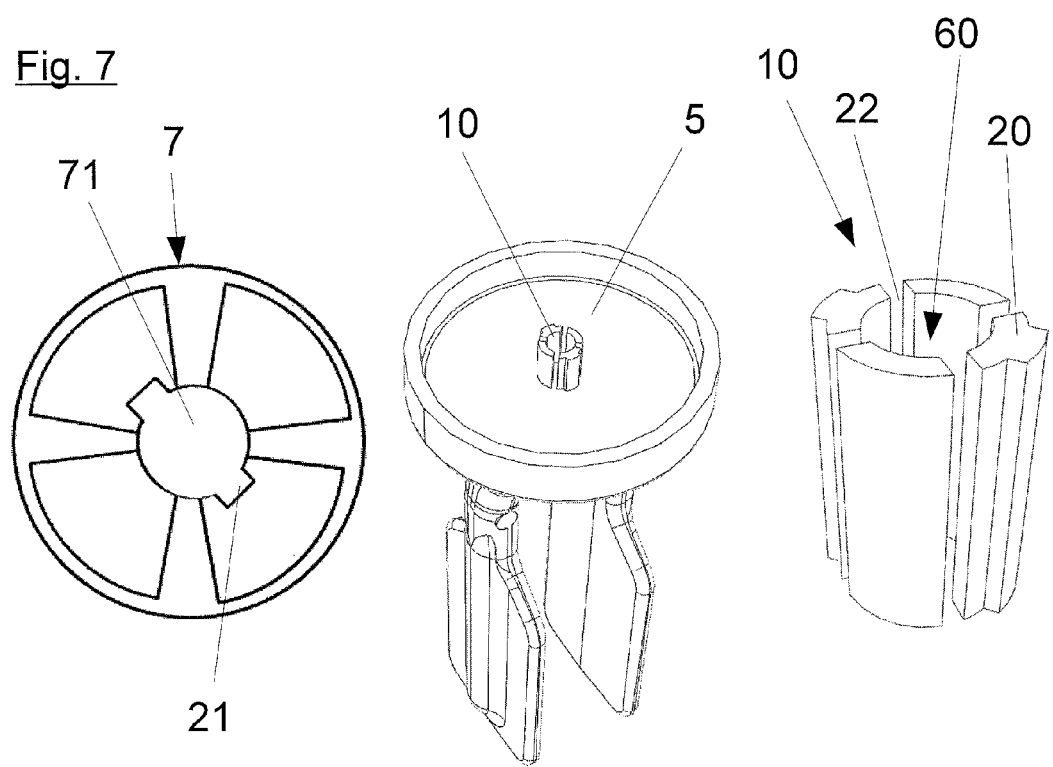
FIG. 7 is a line drawing evidencing an additional embodiment of a vibration sensor.

FIG. 7 shows an alternative embodiment of the vibration sensor 1 from FIG. 2, where in the present embodiment, which is shown only for illustrative purposes, the centering device 10 is designed in such a way that not only a centered orientation of the drive 3 relative to the membrane 5 is achieved by means of a key and lock principle, but also a predefined orientation in the circumferential direction is achieved.

The so-called key and lock principle is achieved for the embodiment, proposed here, by means of a corresponding embodiment of an inner contour of the openings 71, 81 of the piezo actuator 7 and the adaptor ceramic element 8 to an outer contour of the centering device 10. In order to illustrate the present embodiment, the centering device 10 is enlarged in the right-hand section of FIG. 7. In this case the centering device 10, which is designed more or less in the shape of a sleeve and is slotted four times, has two projections 20, which are arranged opposite each other and which form an outer contour that is secure against rotation. The piezo actuator 7, which is shown in the left-hand section of FIG. 7 and is representative of the drive 3, has an opening 71 with recesses 21, which are designed to correspond to the projections 20. Said recesses are designed in such a way that the drive 3 and the centering device 10 can be connected to each other in a predefined orientation in a manner that is secure against rotation. At the same time the above described principle for bonding the individual components of the drive and the membrane can be applied accordingly. In this case the orientation of the transmitting or receiving electrodes 72 of the piezo actuator 7 relative to the position of the paddle 6 is predefined by the inner or outer contours that are designed to correspond to one another.

LIST OF REFERENCE NUMBERS

1 vibration sensor
3 drive
5 membrane
6 paddle
7 piezo actuator
8 adaptor ceramic element
9 rim
10 centering device
12 depression/groove
13 cavity
14 elevation/web
20 projection
21 recess
22 slot
60 space
71 opening
72 electrodes
81 opening The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A vibration sensor comprising a membrane, which is excited to vibrate by means of a drive, wherein the drive has at least one piezo actuator and at least one adaptor ceramic element, and is designed to be bonded with the membrane, wherein the membrane has at least one centering device that is designed so as to be suitable for centering the drive relative to the membrane, wherein one or more of the membrane, the adaptor ceramic element and the piezo actuator have a surface structure that is configured so as to be suitable to promote the spread of the adhesive between the membrane and the adaptor ceramic element or between the adaptor ceramic element and the piezo actuator.

2. The vibration sensor of claim 1, wherein the centering device is designed as a centering dome, which is arranged in a centered manner on the membrane, in the form of a sleeve.

3. The vibration sensor of claim 1, wherein the centering device is designed as a supply device for an adhesive for bonding the drive and the membrane.

4. The vibration sensor of claim 1, wherein the centering device is designed as a hollow cylinder.

5. The vibration sensor of claim 1, wherein the hollow cylinder has at least one opening in a radial direction, preferably slotted in a longitudinal direction.

6. The vibration sensor of claim 1, wherein an adaptor ceramic element is arranged between the membrane and the piezo actuator of the drive.

7. The vibration sensor of claim 1, wherein the surface structure is designed as a depression that is introduced into the membrane and the adaptor ceramic element, the piezo actuator or both the adaptor ceramic element and piezo actuator.

8. The vibration sensor of claim 7, wherein a depression is designed as at least one groove that is introduced into the surface of the membrane and the adaptor ceramic element or the piezo actuator and that is designed to extend in essence in the radial direction.

9. The vibration sensor of claim 8, wherein the surface structure is designed as an elevation.

10. The vibration sensor of claim 9, wherein the elevation is designed as at least one web that is affixed on a surface of the membrane and the adaptor ceramic element, the piezo actuator or both the adaptor ceramic element and the piezo actuator.

11. The vibration sensor of claim 10, wherein the web is designed to extend preferably in the circumferential direction and is arranged on an outer periphery of the membrane, the adaptor ceramic element or the piezo actuator.

12. The vibration sensor of claim 9, wherein the elevation is produced by means of a printing process.

13. The vibration sensor of claim 1, wherein the surface structure has a height of 5 to 30 μm.

14. The vibration sensor of claim 1, further comprising wherein a surface of the membrane that faces the drive is designed so as to be concave.

15. The vibration sensor of claim 1, wherein the centering device and the drive have outer and/or inner contours that are designed so as to correspond to one another and that enable an arrangement of the drive relative to the membrane in a predefined orientation.

16. A production method for a vibration sensor comprising a membrane that is excited to vibrate by means of a drive, wherein the drive and the membrane are bonded to one another, and the drive has at least one piezo actuator, said production method comprising the steps:
arranging in a centered manner the drive on the membrane,
introducing an adhesive into a space, adjacent to the drive and the membrane, whereby the adhesive is distributed between these elements due to a capillary action, and curing the adhesive.

17. The production method of claim 16, wherein the drive consists of at least one adaptor ceramic element and at least one piezo actuator, said method comprising the steps:
arranging in a centered manner the adaptor ceramic element on the membrane,
arranging in a centered manner the piezo actuator on the adaptor ceramic element,
introducing an adhesive into a space, adjacent to the membrane, the adaptor ceramic element and the piezo actuator, whereby the adhesive is distributed between these elements due to a capillary action; and
curing the adhesive.

18. The production method of claim 16, wherein the adhesive is introduced into a centering dome, which is designed essentially in the form of a hollow cylinder and is longitudinally slotted and which keeps the drive centered.

* * * * *